Inventors
Edwin E. Sylvester
Sumner H. Peck
By their Attorney

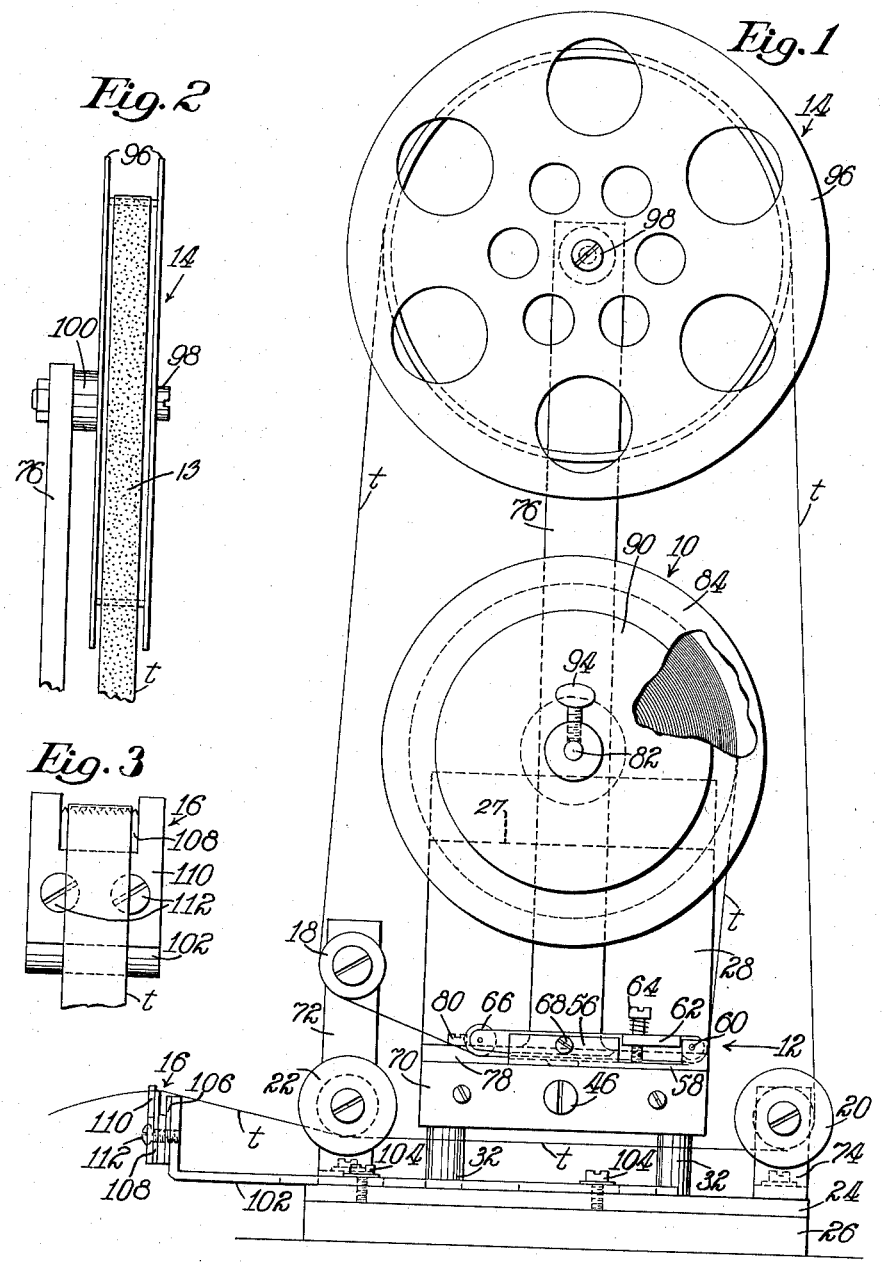

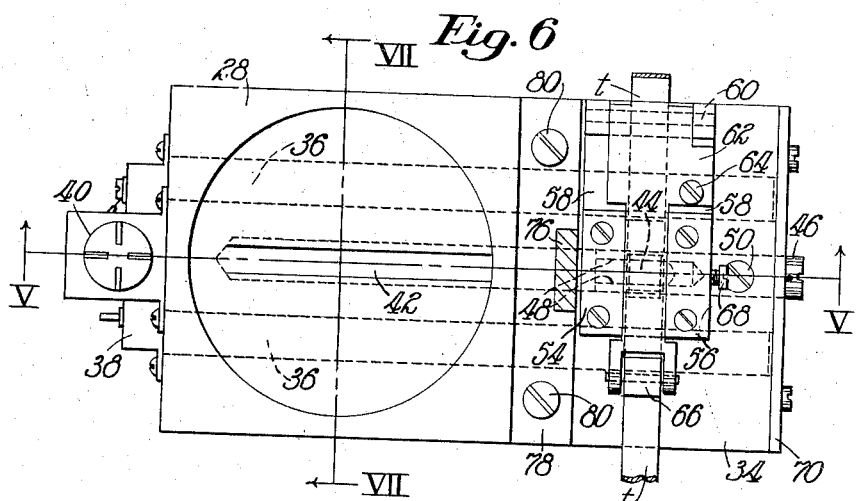
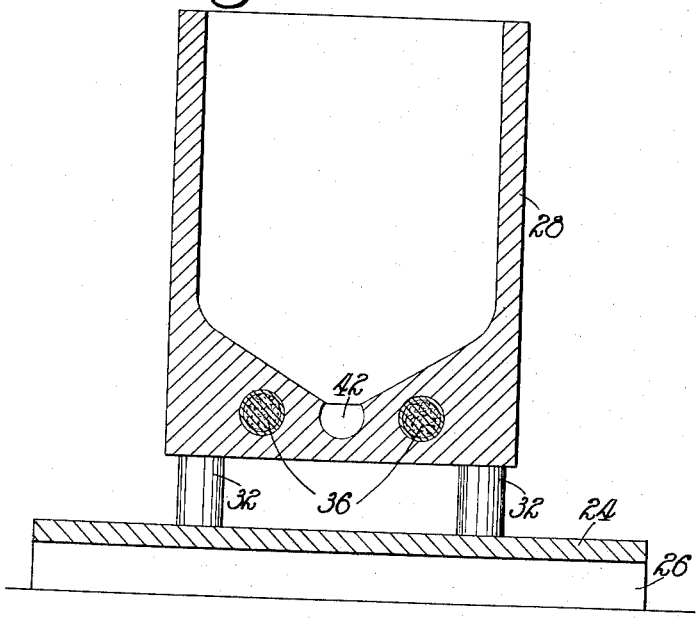

2,861,899

PRESSURE-SENSITIVE ADHESIVE COMPOSITIONS FOR TAPE AND METHODS FOR DISPENSING SAME

Edwin E. Sylvester, Watertown, and Sumner H. Peck, Wakefield, Mass., assignors to B. B. Chemical Co., Boston, Mass., a corporation of Massachusetts Application August 15, 1956, Serial No. 604,190

6 Claims. (Cl. 117—103)

This invention relates to the manufacture of pressure-sensitive adhesive sheet material and to a new pressure-sensitive adhesive composition.

It has been proposed to form pressure-sensitive adhesive tape just prior to use to avoid the difficulty and expense of providing an anti-adhesive backing on the tape, which is necessary if the tape is prepared in advance and stored in rolls. To be a satisfactory substitute for the conventional pressure-sensitive adhesive tape roll dispenser the unit for forming the tape must be simple, compact and inexpensive. Previous proposals to apply solutions or aqueous dispersions of pressure-sensitive adhesive to tape have introduced the complication that the solvent or the water vehicle must be evaporated from the coated surface of the tape; and this evaporation has required fairly extended travel of the tape after coating before it is in a condition for use. The extended travel has necessitated either passing the coated material around a series of rolls which impose a substantial drag on the tape and interfere with simple pulling off of the tape by hand or, on the other hand, a bulky machine including long, unsupported flights of coated tape. Additionally, it has been found desirable in one way or another to hasten the drying of the coating. In the case of organic solvent solutions it is also necessary to dissipate the solvent vapors.

It is a feature of the present invention to provide a new method for the manufacture of pressure-sensitive adhesive sheet materials in a simple manner eliminating the difficulties of drying and removal of solvent or water encountered in previously known methods.

It is a further feature to provide a new pressure-sensitive adhesive composition having desirable aggressively adhesive and strongly cohesive properties and particularly adapted for use in the method of the present invention.

These and other features of the invention will now be described in detail in conjunction with the appended drawings.

In the drawings,

Fig. 1 is a view in side elevation of a tape coating and dispensing apparatus constituting a preferred embodiment of the invention;

Fig. 2 is a view in front elevation of the upper portion of the apparatus shown in Fig. 1;

Fig. 3 is a detail view in front elevation of a tape severing and dispensing device associated with the apparatus shown in Fig. 1;

Fig. 6 is a plan view of adhesive storing and adhesive applying devices associated with the apparatus shown in Fig. 1; and Fig. 7 is an elevation, in section, of the adhesive storing device, the section being taken along line VII—VII of Fig. 6.

Figure 4:
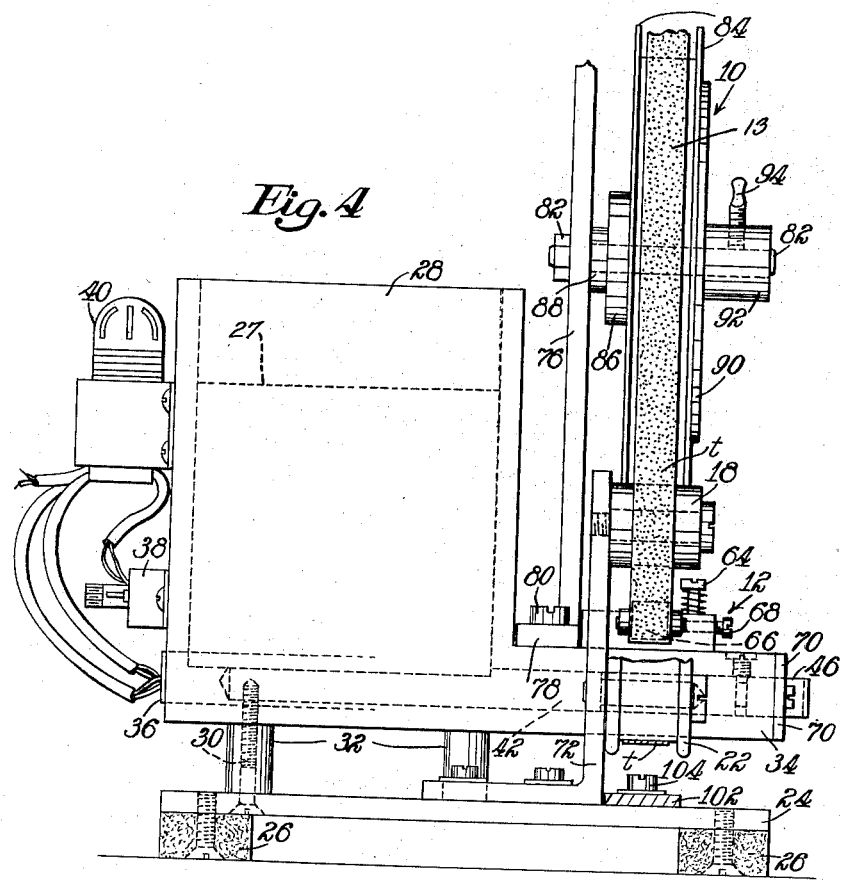
Fig. 4 is a view in front elevation of the apparatus shown in Fig. 1, except that the upper portion of the apparatus has been omitted.

According to the present invention, the difficulties of forming a pressure-sensitive sheet by the known method of solution or dispersion coating are eliminated by providing a new heat stable pressure-sensitive adhesive involving an unusual combination of resins and applying the adhesive in molten form. The new combination of resins in molten form is freely fluid to enable the adhesive to be supplied and to be spread on a surface of a backing by a new system employing simple gravity feed. The resin combination possesses the further important characteristic that it sets up rapidly to an aggressively adhesive film which is also firmly cohesive to give a strong bond between the backing and a surface.

The new method of forming pressure-sensitive adhesive coated sheet material includes the steps of establishing a body of molten adhesive connected to a column of adhesive including a terminal upwardly directed portion preferably ending at a level a small distance below the level of the surface of adhesive in the reservoir to provide a small liquid head. A backing sheet disposed across and with its under side in contact with the end of the column acts, when stationary, as a valve to cut off undesired flow of adhesive from the reservoir and column, but picks up a coating of adhesive when moved relative to the end of the column. Coated portions of the backing are cooled to solidify the molten pressure-sensitive adhesive layer. The method calls for an adhesive which is flowable under slight pressure in order that its flow may be cut off by the backing sheet disposed across the end of the column; and on the other hand, the adhesive must be quick setting to an aggressively adhesive, strongly cohesive state. The system including the simple gravity feed and self controlling flow enables intermittent or continuous production of pressure-sensitive adhesive sheet material just prior to use without the difficulties of drying a liquid vehicle or disposing of solvent vapors.

The new adhesive is a mixture of polyvinyl alkyl ethers and certain styrene polymer resins. The polyvinyl alkyl ethers are known to be effective pressure-sensitive adhesive components; but their characteristics have been such that they have had to be applied either as solutions or by such drastic means as knife coating or calendering using power driven applying equipment. That is, in molten state, those polyvinyl alkyl ether compositions having the necessary aggressive tack have been unstable, too viscous for application by other than power spreading devices or have lacked necessary cohesiveness in cooled condition. By cohesiveness is meant the ability of the film to hold together either to resist transfer to surfaces when used as a "masking" type tape or to provide sufficient strength within itself when used as reinforcing tapes. Resinous modifiers normally used to modify the characteristics of polyvinyl alkyl ethers, for example the polyterpene resins, rosin or rosin derivatives and rubber derivatives, while satisfactory for solution adhesives where the viscosity is reduced by the presence of volatile organic solvents rapidly decompose when held at temperatures necessary to liquefy solvent-free compositions, and give discolored syrupy products.

The styrene polymer resins which are combined with polyvinyl alkyl ethers according to the present invention are members of a class of resins not normally considered as useful in polyvinyl alkyl ether compositions. These resins are polymers of styrene or mixtures of styrene and styrene homologues, for example the crude mixture obtained from the fractionation of the so-called "crude solvent" from "light oils" scrubbed out of coke oven or gas house gas. Only relatively low molecular weight materials are useful, and the commercial resins available as "Piccolastic" resins have been found particularly satisfactory. Of these resins the "A" series "Piccolastics" having molecular weights below 25,000 (weight average molecular weight) show a wider range of compatibility with the polyvinyl alkyl ethers than the other series of "Piccolastics." The preferred resins of this class are styrene polymers having densities at 20° C. of 1.03 to 1.06, melting points Ball and Ring of from 5° C. to 75° C. and melt viscosities at 180° C. of from 4.5 to 32.8 centipoises. It has been observed that even the "A" series "Piccolastic" resins show some evidences of incompatibility with polyvinyl alkyl ethers having longer alkyl chains. For example, with polyvinyl isobutyl ether the compositions and films are cloudy and hazy and the tack characteristics of such films are not as good initially as films of compositions made with polyvinyl ethyl ether and tend to deteriorate after formation.

Styrene polymer resins similar to the "Piccolastics" and useful in the same relationship include the "V" resins produced by Dow Chemical. For example, resin "276 V-2" has a melt viscosity at 60° C. of 100–200 centipoises and behaves much like the "Piccolastics." These materials are substantially unharmed by heat at temperatures required for melting mixtures of them with the polyvinyl alkyl ethers. Although these materials are polymers of aromatic hydrocarbons, it is found that when they are combined with the polyvinyl alkyl ethers and heated a substantially homogeneous liquid is obtained. These low molecular weight styrene polymer materials have a particularly desirable action in admixture with the polyvinyl ethers in that the molten composition has a very low viscosity for a resinous polymer melt.

The preferred polyvinyl alkyl ethers for the adhesives of the present invention are the polyvinyl ethyl ethers. Polymers in which the alkyl groups have from 1 to 4 carbon atoms may be used; but it has been found that when maintained at the temperatures necessary to maintain the mixtures freely fluid undesirable changes such as lump formation may occur with other than the polyvinyl ethyl ethers. These polymers are available in different ranges of molecular weights including the relatively low molecular weight materials having values of from about 5000 to about 50,000 weight average molecular weight and the high molecular weight materials having values in the range of from about 75,000 to about 150,000 weight average molecular weight.

The polyvinyl alkyl ether and the styrene polymer resin may be combined in various proportions to obtain the desired properties in the pressure-sensitive adhesive film. It is important that at least about 20% by weight of the adhesive composition be a polyvinyl alkyl ether in the high molecular weight range. Lower molecular weight polyvinyl alkyl ethers may be used along with the higher polymers if desired. In general, at least about 10% of the styrene polymer material is required to form pressure-sensitive adhesive films possessing the necessary fluidity in molten condition together with the ability to set up promptly to a film having aggressive tack and adequate adhesiveness.

Adhesives which have been found useful in the manufacture of pressure-sensitive adhesive sheet material according to the present invention may comprise from 20% to 70% of the high molecular weight polyvinyl alkyl ether and from 80% to 30% of the styrene polymer resin where these resins are essentially the only resinous components. Where a lower molecular weight polyvinyl alkyl ether is included it has been found that the adhesive should comprise from 25% to 70% of the high molecular weight polyvinyl alkyl ether, from 10% to 50% of the lower molecular weight polyvinyl alkyl ether and from 10% to 50% of the styrene polymer resin.

Mineral fillers may be included in the composition if desired. Suitable fillers include zinc oxide, finely divided calcium silicate, china clays, whiting, floated silica and so on. Only limited quantities, i. e. not more than 15% to 40% by weight, can be used if the desired application characteristics are to be maintained. That is, the fillers tend to increase the apparent viscosity or flowability of the composition at application temperatures. In general, it is preferred to avoid raising the viscosity above about 100,000 centipoises at application temperature, whether through addition of filler or through selection or proportioning of other constituents.

Any of the usual backing materials for pressure-sensitive adhesive sheets and tapes which are firm at the temperature of application may be employed. Thus paper, whether smooth, creped, kraft, or reinforced, fabric whether woven or unwoven, films of polyester resin from reaction of terephthalic acid and a glycol, e. g. the commercial film known as "Mylar," glass fiber sheets and metal are suitable backing materials. For intermittent operation, where portions of the backing sheet may remain in contact with the hot molten adhesive at the point of application for a substantial period of time, it is desirable to use a backing material which is not appreciably discolored or weakened by the heat, and a preferred backing is a 40 lb. kraft paper.

In the method of coating a backing sheet such as a tape with the new adhesive, the adhesive may be introduced into an apparatus such as that shown in the United States patent application of Hans C. Paulsen, entitled "Tape Coating and Dispensing Apparatus," Serial No. 568,914, filed March 1, 1956, although other comparable apparatus may be used. The apparatus described in that application comprises a support 10 (Fig. 1) for a supply of uncoated tape t made of suitable material such as paper, a tape coating or adhesive applying device 12, a support 14 for a single convolution of coated tape t which permits the coat 13 of adhesive on the tape t to cool, a tape dispensing and severing device 16 and finally tape guiding rolls 18, 20 and 22 for conducting the tape from one device to the other.

As shown, the tape supply is in the form of a coil mounted on a reel from which the tape extends downwardly to the adhesive applying device 12. The tape passes through the device 12 to become uniformly coated with adhesive on one side thereof, thence to the tape guiding roll 18 and from there over the support 14 which also is in the form of a reel, thence downwardly over the tape guiding rolls 20, 22 to the tape dispensing and severing device 16.

The various devices or instrumentalities of the illustrated apparatus are supported on a base plate 24 which is secured to supporting members 26 as shown in Figs. 1 and 4.

The adhesive 27 to be applied to the tape is stored in a reservoir pot 28 (Figs. 4, 6 and 7) of rectangular cross section with a rounded hollow interior and a slanting bottom shown in Fig. 7. Since the adhesive 27 contained in the pot 28 is heated and applied while hot, it will be necessary to heat the pot 28. To avoid undue heating of the base plate 24, by contact with the pot 28, the latter is secured to the base plate 24 in spaced relation thereto. More specifically, four screws 30 (one shown in Fig. 4) spaced equally apart extend upwardly from the base plate 24 in which they are secured, into tapped holes provided in the bottom wall of the pot 28. The four screws 30 are surrounded by sleeves or bushings 32 contacting with their opposite ends the base plate 24 and the outer bottom face of the pot 28.

Figure 5:
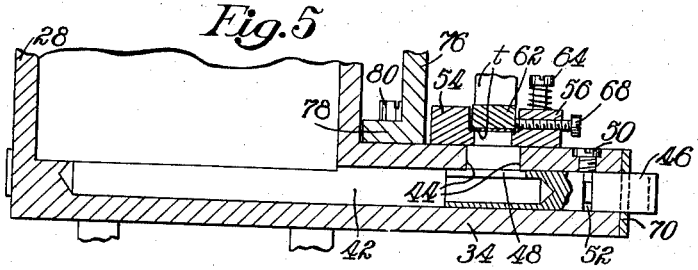
Fig. 5 is a sectional view, the section being taken along the line V—V of Fig. 6.

As illustrated in Figs. 4 and 5, the pot 28 is provided at its right-hand side (as seen in these figures) with a lower lateral extension 34.

The adhesive 27 in the pot as well as in the just mentioned lateral extension 34 is heated by two heating cartridges 36 located in horizontal bores extending through the bottom portion of the pot 28 as well as through the lateral extension 34. Secured to the left-hand side face of the pot 28 (as seen in Fig. 4) is a thermostat 38 to regulate and keep uniform the temperature to which the pot 28 is heated. Connected in the circuit of the thermostat and cartridges 36 is a pilot lamp 40 mounted in a housing, the entire electrical installation being connectable to a source of electric current.

Provided in the interior bottom of the pot 28 is a circular conduit or passage 42 (Figs. 5, 6 and 7) which extends to the right of Fig. 6 through the entire lateral extension 34 of the pot. As shown best in Fig. 5, this passage 42 is in communication with a vertical passage 44 which actually is a rectangular hole provided in the upper portion of the lateral extension 34 above the passage 44. In accordance with the principles of barometric feed a column of the fluid adhesive flows from the reservoir or pot 28 into the lateral extension 34 and through the terminal upwardly directed passage 44.

To regulate the flow of adhesive or shut it off completely, there is provided a rotary valve member 46 (Figs. 4, 5 and 6) mounted in the circular passage 42 in the lateral extension 34 and extending somewhat outwardly, beyond the right-hand side of the extension 34 to facilitate its rotation by the operator. The left-hand portion of the valve member 46, as shown in Fig. 5, is hollow and is provided with a cut-out 48 in the form of an open-ended slot extending axially from the left-hand end of the valve member. As will be seen, in the adjusted position of the rotary valve member 46 in which the cut-out 48 is in register with the passage 44, the adhesive may flow from the pot 28 through the passage 42 and the valve member 46 into the passage 44 to be applied to the tape. To shut off the flow of adhesive the valve member 46 is rotated to close the lower end of the passage 44, and to that end there is provided in the end face of the outwardly extending portion of the valve member 46 a slot (see Fig. 1) into which may be inserted a screw driver for the purpose of rotating the valve member 46. To hold the valve member 46 in place, there is threaded into the upper portion of the lateral extension 34 a screw 50 (Fig. 5) having a reduced lower end which engages a circumferential groove 52 machined into the valve member 46 at right angles to the latter's longitudinal axis.

As shown best in Fig. 5, there are provided on top of the lateral extension 34 at opposite sides of the passage 44 small blocks 54, 56 attached to the extension 34 by screws and providing between them a passage, which in fact is a vertical extension of the passage 44 and into which the adhesive may flow from the passage 44. The opposite inner faces of the blocks 54, 56 are provided with small shoulder portions for supporting the tape which is passed horizontally along these shoulder portions by the application of manual pull to the tape by the operator at the dispensing device 16. The two blocks 54, 56 have rearward extensions 58 (Fig. 6) which carry in lugs provided at their rear ends a hinge pin 60 on which is rotatably mounted a tape holddown member 62. A portion of the member 62 fits into the passage provided between the blocks 54, 56, resting on the tape and serving the purpose not only of holding the tape down in its adhesive applying position over the passage 44 and with its under side in contact with the end of the column of adhesive coming up out of the passage 44 into the passage between the blocks 54, 56 but also controlling the thickness of the coat of adhesive applied to the tape and insuring the uniformity of this coat across the entire width of the tape. The operative position of the hinged holddown member 62 is adjustable by means of a set screw 64 (Figs. 5 and 6) carried by a lateral extension of the holddown member 62 and seated upon the rearward extension 58 of the small block 56. Supported on the forked front end of the holddown member 62, in front of the front ends of the blocks 54 and 56, is a small roll 66 over which the coated tape "*t*" runs as it emerges out of the adhesive applying device, the tape passing into the adhesive applying device beneath the rear end of the holddown member 62 which is spaced from the top face of the lateral extension 34. The holddown member 62 is locked in its adjusted operative position by a small binding screw 68 threaded through the block 56 and engaging the right-hand side face of the holddown member 62 as shown in Fig. 5.

To cover up the bore holes provided in the lateral extension 34 which bore holes house the two cartridges 36 as well as valve member 46, there is provided a face plate 70 secured to the right-hand end portion (Fig. 6) of the lateral extension 34 by screws.

To support the above-mentioned tape guiding rolls 18 and 22 there is provided an angle iron 72 (Figs. 1 and 4) which is screw-attached to the base plate 24 and supports the rolls 18 and 20 on pivot screws. Likewise, there is provided an angle iron 74, also screw-attached to the base plate 24, for pivotally supporting the roll 20 as shown in Fig. 1.

Moreover, there is provided an upright elongated member 76 (Figs. 1, 2, 4 to 6) for carrying the support 10 for the supply of uncoated tape as well as the support 14 for one convolution of coated tape. This upright supporting member 76 is integral with a rectangular foot plate 78 (Figs. 1, 4 to 6) which is secured to the top of the lateral extension 34, between the pot 28 and the adhesive applying device 12, by two screws 80 as shown best in Fig. 6.

The support 10 for the coiled supply of uncoated tape is rotatably mounted on the upright 78 by a screw 82 (Fig. 4) carrying a reel 84 upon which the coiled supply of uncoated tape is wound. A hub portion 86 of the reel is held in spaced relation to the upright 76 by a spacing collar 88 and the right-hand end portion of the screw 82 carries a circular retaining plate 90 and a collar 92 which is held against rotation by a binding thumb screw 94 engaging the screw 82. It will be readily seen that by releasing the thumb screw 94 and slipping the collar 92 and plate 90 off the screw 82, the empty reel 84 may be easily removed and a new supply reel may be put in its place.

The above-mentioned support 14 for one convolution of coated tape, which permits the tape, after it has been coated, to cool off before it is dispensed, is mounted on the upper end of the upright 76 and comprises in essence a reel 96 (Figs. 1 and 2) of relatively large diameter. In fact, the reel is of such diameter that one convolution of coated tape may be supported by it substantially between the adhesive applying means 12 and the tape dispensing means 16 or, more specifically, between the tape guiding roll 18 which, as shown in Fig. 1, is located adjacent to that portion of the adhesive applying device 12 whence the coated tape emerges therefrom and the rolls 20 and 22 which guide or direct the coated tape to the tape dispensing device 16. As shown in Fig. 2, the reel 96 is supported on a screw 98 extending through the upper end of the upright 76 and held in place by a lock nut. A spacer 100 surrounding the screw between the upright 76 and the reel 96 provides sufficient clearance for the unimpeded rotation of the reel 96.

The above-mentioned tape dispensing and severing device 16 is supported on an angle iron 102 (Fig. 1) secured on top of the base plate 24 by screws 104 and extending outwardly toward the left of Fig. 1. The top end face of the vertical portion of the angle iron 102 and an adjacent backing plate 106 serve to hold the end of the coated tape in readiness to be grasped by the operator, who by pulling on it, will reel off an extent of tape of the desired length which then is severed by applying a downward pull to the tape while resting across the serrated top edge of a cutting plate 108 (Figs. 1 and 3), which plate as well as the backing plate 106 are held in place by a front plate 110 and two attaching screws 112 securing these parts as well as an intermediate spacer plate to the angle iron 102. As shown in Fig. 3, the front plate 110 has provided in its top portion a recess to expose the serrated top edge of the cutting plate 108 and to permit the tape to be readily pulled off and severed.

Using the apparatus, the adhesive of the present invention is introduced into the pot and is brought to a temperature at which it is a freely fluid, clear liquid readily flowable from the pot 28 through the passages 42 and 44 to the applying station defined by the blocks 54 and 56. It will be observed that only a relatively small head represented by the difference in level, which may be from 2 to 6 inches between the adhesive in pot 28 and the level of the shoulders on the blocks 54 and 56 is required. A backing tape which may be of paper or other material is withdrawn from the reel 84, passed beneath the guide roll 60, over the space between the blocks 54 and 56 and thence under the roll 66. The tape is held in light contact with the end of the column of adhesive in the opening between the blocks 54 and 56 by the member 62. In passing in contact with the adhesive from the passage 44 the under surface of the backing is given a uniform coat of adhesive which may range in thickness from .01 to .05 and this coating solidifies during movement of the coated backing in the path defined by the roll 18, the relatively large diameter reel 96 and the rolls 20 and 22. The path traveled by the tape after coating may be only about 24" in length but because of the rapid setting up of the adhesive coating on cooling the tape may be drawn continuously from this system at rates up to 12" per second.

The following examples are given to aid in understanding the invention but it is to be understood that the invention is not restricted to the components, proportions, or conditions given in the examples:

*Example I*

The following resins were mixed at a temperature maintained between 260° to 270° F.:

| | Percent by weight |
|---|---|
| Polyvinyl ethyl ether A | 31.2 |
| Polyvinyl ethyl ether B | 31.2 |
| Low molecular weight polystyrene C | 37.6 |

Polyvinyl ethyl ether A is a high molecular weight polymer believed to have a weight average molecular weight of about 100,000 and has a viscosity, 10% solution in toluol at 25° C. (Brookfield Viscometer), of 27,000 centipoises. Polyvinyl ethyl ether B is a relatively low molecular weight polymer believed to have a weight average molecular weight in the range of 20,000 to 40,000 and has a viscosity, 10% solution in toluol at 25° C. (Brookfield Viscometer), of 7.6 centipoises. The low molecular weight polystyrene C has a viscosity, 70% by weight solution in toluol at 25° C. (Brookfield Viscometer), of 1.4 poises, melting point 75° C., density 1.06 at 20° C., refractive index 1.59 at 20° C.

The adhesive mixture is introduced into the pot 28 of the apparatus and brought to a temperature of about 350° F., at which temperature the mixture had a viscosity of 46,000 centipoises. The molten adhesive mixture readily flowed in a column through the passages 42 and 44 terminating in an upwardly directed portion leading to the point of application between the blocks 54 and 56. The liquid head between the surfaces of adhesive in the pot 28 and at the point of application was about 3½". A 40 lb. kraft paper tape is withdrawn from the reel 84, passed beneath the guide roll 60, between the blocks 54 and 56, and thence under roll 66. Successive lengths of the tape were withdrawn at a rate of about 6" per second. The undersurface of the tape was found to be uniformly coated with the adhesive. The coated adhesive passed up around the roll 18, the reel 96 and the rolls 20 and 22, and was withdrawn over a cutoff device 108. Upon withdrawal past the cutting device, it was found that the coating had solidified to a solid, aggressively tacky, strongly cohesive layer on the paper backing.

*Example II*

A second adhesive mixture was prepared by mixing the following ingredients at 270° F.:

| | Percent by weight |
|---|---|
| Polyvinyl ethyl ether A | 40 |
| Low molecular weight polystyrene C | 30 |
| Liquid low molecular weight polystyrene D | 30 |

The liquid low molecular weight polystyrene D had a viscosity at 60° C. of 100 to 200 centipoises.

This composition was applied to paper using the same apparatus and the same conditions employed in Example I. The adhesive coated tape obtained was found useful as a reinforcing tape for shoe use.

*Example III*

The following components were mixed at a temperature of about 270° F.:

| | Percent by weight |
|---|---|
| Polyvinyl ethyl ether A | 20 |
| Polyvinyl ethyl ether B | 20 |
| Low molecular weight polystyrene C | 40 |
| Zinc oxide | 20 |

This composition was applied to a Buna-N impregnated creped paper tape in the apparatus and under the same conditions that were employed in Example I. The adhesive coating on the tape showed strong aggressive tack and superior resistance to cold flow. The tape was useful as a reinforcing tape for packaging use.

The simplicity of the system including the gravity feed and the uncomplicated path in which the tape passes after coating means that a minimum drag is imposed on the tape such that it can readily be withdrawn by hand as needed.

Having thus described our invention, what we claim as new and desire to secure by Letters Patent of the United States is:

1. The method of forming pressure-sensitive adhesive coated sheet material which includes the steps of providing a body of heat stable, substantially solvent free, pressure-sensitive adhesive comprising a mixture of thermoplastic resins consisting essentially of at least one polyvinyl alkyl ether in which the alkyl group has from 2 to 4 carbon atoms and a low molecular weight styrene polymer composed of at least one styrene from the group consisting of styrene and styrene homologues, said mixture comprising from about 20% to about 70% by weight of a high molecular weight polyvinyl alkyl ether and at least about 10% by weight of said low molecular weight polymer of a styrene, heating said body of adhesive to bring it to fluid molten condition, flowing molten adhesive from said body by gravity in a column including a terminal upwardly directed column portion ending at a level below the level of the surface of adhesive in said body of molten adhesive, disposing a backing sheet across and with its under side in contact with the end of said column of molten adhesive to restrain flow of said column, moving said backing sheet across the end of said column to coat successive portions of the under side of said backing with said mixture, and then cooling said successive portions of said backing with the coating out of contact with other surfaces to solidify said mixture to a strongly cohesive pressure-sensitive adhesive layer on said backing.

2. The method of forming pressure-sensitive adhesive coated sheet material which includes the steps of providing a body of heat stable, substantially solvent free, pressure-sensitive adhesive comprising a mixture of thermoplastic resins consisting essentially of from about 20% to about 70% by weight of a high molecular weight polyvinyl ethyl ether and from about 80% to about 30% by weight of a low molecular weight polymer composed of at least one styrene from the group consisting of styrene and styrene homologues, heating said body of adhesive to bring it to fluid molten condition, flowing molten adhesive from said body by gravity in a column including a terminal upwardly directed column portion ending at a level below the level of the surface of adhesive in said body of molten adhesive, disposing a backing sheet across and with its under side in contact with the end of said column of molten adhesive to restrain flow of said column, moving said backing sheet across the end of said column to coat successive portions of the under side of said backing with said mixture, and then cooling said successive portions of said backing with the coating out of contact with other surfaces to solidify said mixture to a strongly cohesive pressure-sensitive adhesive layer on said backing.

3. The method of forming pressure-sensitive adhesive coated sheet material which includes the steps of providing a body of heat stable, substantially solvent free, pressure-sensitive adhesive comprising a mixture of thermoplastic resins consisting essentially of from about 25% to about 70% by weight of a high molecular weight polyvinyl ethyl ether, from about 10% to about 50% by weight of a low molecular weight polyvinyl ethyl ether, and from about 10% to about 50% by weight of a polymer composed of at least one styrene from the group consisting of styrene and styrene homologues having a molecular weight of not more than about 25,000, heating said body of adhesive to bring it to fluid molten condition, flowing molten adhesive from said body by gravity alone in a column including a terminal upwardly directed column portion ending at a level below the level of the surface of adhesive in said body of molten adhesive, disposing a backing sheet across and with its under side in contact with the end of said column of molten adhesive to restrain flow of said column, moving said backing sheet across the end of said column to coat successive portions of the under side of said backing with said mixture, and then cooling said successive coated portions of said backing with the coating out of contact with other surfaces to solidify said mixture to a strongly cohesive pressure-sensitive adhesive layer on said backing.

4. A pressure-sensitive adhesive composition comprising a heat stable, substantially solvent free mixture of thermoplastic resins consisting essentially of at least one polyvinyl alkyl ether in which the alkyl group has from 2 to 4 carbon atoms and a low molecular weight styrene polymer composed of at least one styrene from the group consisting of styrene and styrene homologues, said mixture comprising from about 20% to about 70% by weight of high molecular weight polyvinyl alkyl ether and at least about 10% by weight of said styrene polymer.

5. A pressure-sensitive adhesive composition for hot melt application to a backing comprising a heat stable, substantially solvent free mixture of thermoplastic resins consisting essentially of polyvinyl ethyl ether and a low molecular weight styrene polymer composed of at least one styrene from the group consisting of styrene and styrene homologues, said mixture comprising from about 20% to about 70% by weight of high molecular weight polyvinyl ethyl ether and from about 60% to about 30% by weight of said styrene polymer.

6. A pressure-sensitive adhesive composition for hot melt application to a backing comprising a heat stable, substantially solvent free mixture of thermoplastic resins consisting essentially of polyvinyl ethyl ether and a low molecular weight styrene polymer composed of at least one styrene from the group consisting of styrene and styrene homologues, said mixture comprising from about 25% to about 70% by weight of a high molecular weight polyvinyl ethyl ether, from about 10% to about 50% by weight of a low molecular weight polyvinyl ethyl ether and from about 10% to about 50% by weight of said styrene polymer, said adhesive composition having a short setting up time from molten condition to a solid, aggressively adhesive, strongly cohesive state.

References Cited in the file of this patent

UNITED STATES PATENTS

| | | |
|---|---|---|
| 1,391,281 | Snyder | Sept. 20, 1921 |
| 2,192,453 | Rentsch | Mar. 5, 1940 |
| 2,571,928 | Newberg | Oct. 16, 1951 |
| 2,647,100 | Salditt | July 28, 1953 |